United States Patent [19]
Tripp

[11] 3,922,671
[45] Nov. 25, 1975

[54] POSITION MEASUREMENT SYSTEM WITH PROVISION FOR CHANGE OF UNITS OF MEASUREMENT

[75] Inventor: Robert W. Tripp, Tuckahoe, N.Y.
[73] Assignee: Inductosyn Corporation, Valhalla, N.Y.
[22] Filed: June 17, 1974
[21] Appl. No.: 480,442

[52] U.S. Cl. .............. 340/347 SY; 340/347 DA; 235/151.11; 318/603
[51] Int. Cl.² ............................................ G08C 9/04
[58] Field of Search .............. 340/347 DA, 347 AD; 318/603; 235/151.11, 197; 328/55

[56] References Cited
UNITED STATES PATENTS
3,742,487   6/1973   Tripp ........................ 340/347 DA Primary Examiner—Charles D. Miller
Attorney, Agent, or Firm—William E. Beatty; John L. Downing

[57] ABSTRACT

A position measurement system is disclosed including an improved pulse-width modulator in which positive and negative modulation counters respectively provide first and second modulator pulses having a time displacement therebetween proportional to a displacement between relatively movable members of a transducer. The modulation counters can be loaded to store signals representative of a cumulative number of least changes of the displacement, and clock pulses are provided to the modulation counters whereby the modulator output pulses are generated. The time displacement between the output pulses is changed in proportion to the cumulative number of the least changes stored by the counters. This arrangement permits the modulator counters to be modified in a predetermined fashion so that the least indicated change can represent alternatively a quantity in one of a plurality of measurement systems, e.g. in inch or metric units. In making this conversion, however, the delay in which data changes are recognizable in the output is not thereby increased and the effective information rate of the system is maintained.

6 Claims, 10 Drawing Figures

POSITION MEASUREMENT SYSTEM WITH PROVISION FOR CHANGE OF UNITS OF MEASUREMENT

BACKGROUND OF THE INVENTION

1. Field of the Invention

This invention relates to measurement systems, and more particularly, to an improved position measurement system for indicating the displacement between two relatively movable members of a transducer.

2. Description of the Prior Art

Position measurement systems are frequently employed with machine tools to indicate the position of a workpiece with reference to a machine bed reference position. One measurement device usable in many such systems is described in U.S. Pat. No. 2,799,835 for "Postion Measuring Transformer" by R. W. Tripp et al. issued July 16, 1957 is sold under the mark Inductosyn. (Inductosyn is a registered trademark of Inductosyn Corporation.)

The Inductosyn device, either in its rotary or linear form, senses very small changes in position by means of electrical coupling between relatively movable primary and secondary windings separated by a small air space. In practice one set of windings of a linerar Inductosyn device can be attached to the movable machine tool workpiece and the other set can be fixed to the machine bed.

The Inductosyn transducer is designed so that relative movement between the sets of windings is divided into a plurality of equal segments called transducer cycles, and each cycle is defined to include a transducer angle sector of 360°. The relative linear or angular displacement of the members of the transducer within a transducer cycle is further defined as the principal transducer angle.

If one set of transducer windings is supplied with electrical signals having amplitudes respectively proportional to the sine and cosine of a predetermined principal transducer angle, an electrical error signal is generated across the other set of windings with its amplitude a function of the difference between the predetermined principal transducer angle and the actual angular displacement of the transducer members within a transducer cycle. When the actual angular displacement of the members equals the predetermined angle the error signal is a null.

Numerous systems have been proposed for generating signals having amplitudes resepctively proportional to the sine and cosine of a predetermined principal transducer angle. Such systems have been disclosed in Tripp U.S. Pat. No. 3,514,775 for "Digital to Analog Converter" issued May 27, 1970, Tripp U.S. Pat. No. 3,673,395 for "High Speed Digital Tracking System," issued June 27, 1972, and Tripp U.S. Pat. No. 3,745,560 for "Trigonometric Signal Generator and Machine Control," issued July 10, 1973, all of which are incorporated herein by reference. These systems include digital to analog converters which utilize the principle that a periodic rectangular waveform provided at a carrier frequency is composed of an infinite series of sinusoidal components having respective frequencies which are integer multiples of the carrier frequency. By means of pulse-width modulation the amplitude of the fundamental sinusiodal frequency component of the periodic rectangular waveform can be varied to be proportional to the sine of a given angle. Similarly, another periodic rectangular waveform complementary to the first rectangular waveform will have a fundamental sinusoidal frequency component whose amplitude is proportional to the cosine of the given angle.

As noted, when such a pulse-width modulator supplies complementary sine and cosine rectangular waveforms at a carrier frequency to the position measuring transducer, the transducer produces an error signal whose fundamental sinusoidal frequency component has its amplitude a function of the relative displacement of the movable members of the transducers from the desired principal transducer angle. This analog error signal can then be converted to a train of digital tracking pulses, the number of pulses being proportional to the magnitude of the error signal, and these tracking pulses can be fed back to the pulse-width modulator so that the error signal is brought to a null and an indication of the actual position (principal transducer angle) of the transducer (and workpiece) can be displayed.

One pulse-width modulator of the prior art disclosed in the aforementioned Tripp U.S. Pat. No. 3,745,560 comprises first and second clock driven modulation counters which provide periodic rectangular waveforms. The analog error signal from the transducer is periodically converted to a train of tracking pulses and the modulation counters are altered accordingly so that the relative phase between the respective rectangular waveforms is changed by an amount proportional to the error count difference. The rectangular waveforms are then logically combined to produce two pulse-width modulated output signals, each including a fundamental sinusoidal frequency component having an amplitude proportional to a position-defining trigonometric function of the digital tracking pulse input.

In prior measurement systems, it will be understood, the information rate, i.e., the rate at which changes in transducer position were recognizable in the output was directly proportional to the fundamental or carrier frequency of the modulation pulses. With the improved pulse-width modulator of the present invention, however, the delay in which position changes can be reflected in the output is reduced, thus essentially maintaining the information rate of the measurement system without any increase in the clock rate.

The arrangement of the present invention also permits the indication of a position in one of a plurality of measurement systems. Thus, the least indicated change in the system can be alternatively a decimal fraction of an inch or a decimal fraction of a meter. Or, for example, the system readout can be changed from the indication of the radius of an element to the indication of its diameter. Apparatus which accomplishes a related function is disclosed in U.S. Pat. application Ser. No. 354,264 for "Scalar Multiplier," filed Apr. 25, 1973 by R. W. Tripp and assigned to the assignee of the present invention. However, the apparatus shown in that application for varying the measurement system of the position readout is essentially dissimilar from that taught hereinafter.

SUMMARY OF THE INVENTION

The present invention comprises a position measurement system utilizing a position measurement transducer with two relatively movable members. The transducer is connected to a generator which provides a tracking pulse in response to a least change in the relative position of said members (i.e., in the principal transducer angle thereof), and a signal indicative of the direction of the change. The tracking pulse and direction signal are transmitted to a pulse-width modulator wherein a clock pulse source provides clock pulses to first and second modulation counters. These modulation counters are of the known type which stores a signal representation of a number which is increased in response to a clock pulse and which produces a modulator output pulse concurrently with the storing of a signal representative of a predetermined maximum number. The two modulation counters are connected to an output circuit which provides the transducer with a sine output pulse having a pulse-width proportional to a time displacement between corresponding portions of the first and second modulator pulses so that the fundamental frequency component of the sine output pulse has an amplitude proportional to the sine of the principal transducer angle. Additionally, the output circuit provides a cosine output having a fundamental frequency component proportional to the cosine of the principal transducer angle. The particular improvement of this invention in such a measurement system comprises positive accumulation means for storing a signal representation of a positive base number which is changed (incremented or decremented) in response to a tracking pulse of a known direction so that the base number signal is representative of a cumulative change in the position of said transducer members. This base number signal representation is loaded into one of the modulation counters by loading means so that the pulse-width of the sine output pulse is altered by an amount proportional to the cumulative change of position in a predetermined measurement system. In the preferred embodiment the invention also comprises negative accumulation means for holding a signal representation of a negative base number. The negative accumulation means is responsive to a tracking pulse in an opposite manner from said positive accumulation means, and the negative base number is loaded into the other modulation counter. Thus, in either case an accumulated change in transducer displacement is introduced into the output circuitry.

In the preferred embodiment disclosed herein the loading means also comprises circuit means for loading the modulation counters with a predetermined reference number signal representation so that the count range of the modulation counters is effectively changed. The reference number is associated with a predetermined measurement system whereby a least change in said sine or cosine output is proportional to one unit in said measurement system. In this way a transducer having a trasnducer cycle in Imperial (inch) units can be used to generate tracking pulses representative of a least changes in metric units, or vice versa. The tracking pulses, together with the displacement direction signal from the tracking pulse generator can then control an up/down counter for readout display of the transducer position in a desired measurement system.

Conversion between measurement systems involving division by a number having fewer than 4 factors of 2 therein (e.g., the division of 0.2 inch by 5080 to obtain $1 \times 10^{-6}$ meter, wherein 5080 has only 3 factors of 2) is not viable by means of the referenced prior art without degrading system performance or significantly increasing hardware requirements. The present invention can perform such conversions with the addition of relatively little logical circuitry while maintaining high system performance.

DESCRIPTION OF A PREFERRED EMBODIMENT

Figure 1:
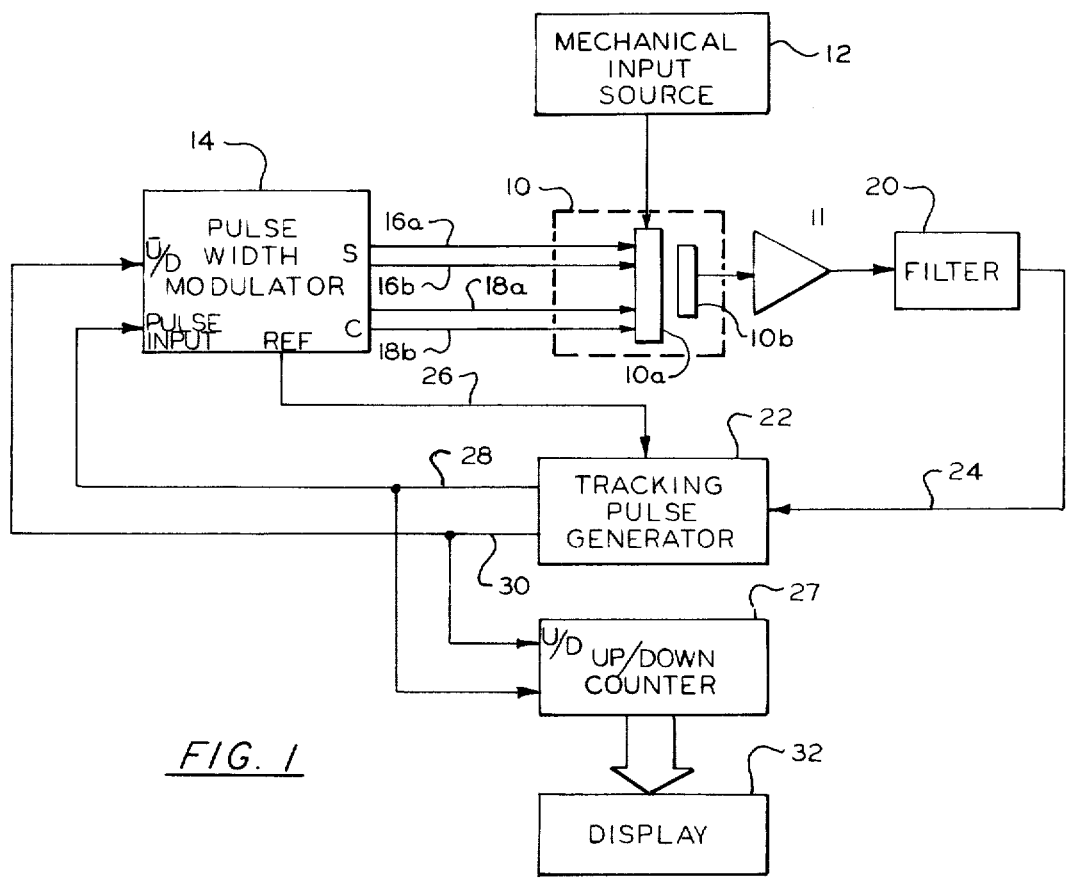
FIG. 1 is a block diagram of a position measurement system including an improved pulse-width modulator in accordance with the present invention.

FIG. 1, shows the present invention in a position measurement indicating system wherein an Inductosyn transducer 10 is connected to a mechanical input source 12. In response to an input from the source 12, a pair of relatively movable members 10a, 10b of the transducer 10 have a positional displacement therebetween.

The transducer 10 provides an error signal in response to a difference between an indicated angle and the displacement angle referred to hereinbefore as the principal transducer angle. As explained hereinafter, the indicated angle is changed (in response to the error signal) to substantially equal the principal transducer angle.

The transducer member 10a receives a sine train of current pulses and a cosine train of current pulses from a pulsewidth modulator 14 through signal lines 16a, 16b and signal lines 18a, 18b, respectively. The sine and the cosine pulse trains each include a carrier frequency component. The carrier frquency components of the sine and cosine pulse trains have respective amplitudes proportional to the sine and the cosine of the indicated angle.

The transducer member 10b provides an error pulse train of signal pulses having a carrier frequency component which comprises the error signal. The amplitude of the error pulse train is a null (causing the error signal to be a null) when the indicated angle equals the principal transducer angle. In response to the indicated angle being greater than the principal transducer angle, the amplitude of the error pulse train departs from null whereby the error signal is in phase with a reference signal provided by the modulator 14. Correspondingly, in response to the indicated angle being less than the principal transducer angle, the error signal is out of phase with the reference signal.

The error pulse train from transducer member 10b is amplified by an amplifier 11 which is connected to a low pass filter 20 to eliminate harmonics of the carrier frequency from the error pulse train and which provides at the output thereof the error signal. Such low pass filters are well known in the prior art.

The output of the filter 20 is connected to a tracking pulse generator 22 through a signal line 24. The generator 22 is additionally connected to a reference signal output of the modulator 14 through a signal line 26 whereby the reference signal is provided to the generator 22.

In response to the error and the reference signals, the generator 22 may provide a tracking pulse which is representative of a least change (either an increase or a decrease) of the actual displacement angle. It should be understood that a cumulative difference between least increases and least decreases is representative of the actual displacement.

Concurrent with the provision of the tracking pulse, the generator 22 provides a directional signal. The directional signal is approximately three volts (referred to as ONE hereinafter) when the tracking pulse is representative of a least decrease of the actual displacement; approximately ground potential (referred to as ZERO hereinafter) is provided when the tracking pulse is representative of a least increase of the actual displacement. As known to those skilled in the art, ONE and ZERO are collectively referred to as logic signals. Circuitry for providing a tracking pulse generator such as the generator 22 is disclosed in Tripp U.S. Pat. No. 3,609,320 in which a phase detector (18) and internal control logic (5) are used to generate a tracking pulse (RCT) and directional signal (U/Dn). This circuitry is described at col. 6 line 65 through col. 7 line 25 and at col. 14 lines 21-75 of the above-noted patent.

The generator 22 provides the tracking pulse and the direction signal to an UP/DOWN counter 27 through signal lines 28, 30, respectively. The counter 27 provides a signal representation of the cumulative difference between the least increases and the least decreases whereby a signal representation of the actual displacement is provided. The output of the counter 27 is connected to a numeric display 32 which provides a display of illuminated numerals representative of the actual displacement.

The generator 22 is additionally connected to the modulator 14 through the lines 28, 30. The modulator 14 provides the sine and the cosine pulse trains referred to hereinbefore in response to the tracking pulse and the direction signal.

Figure 2:
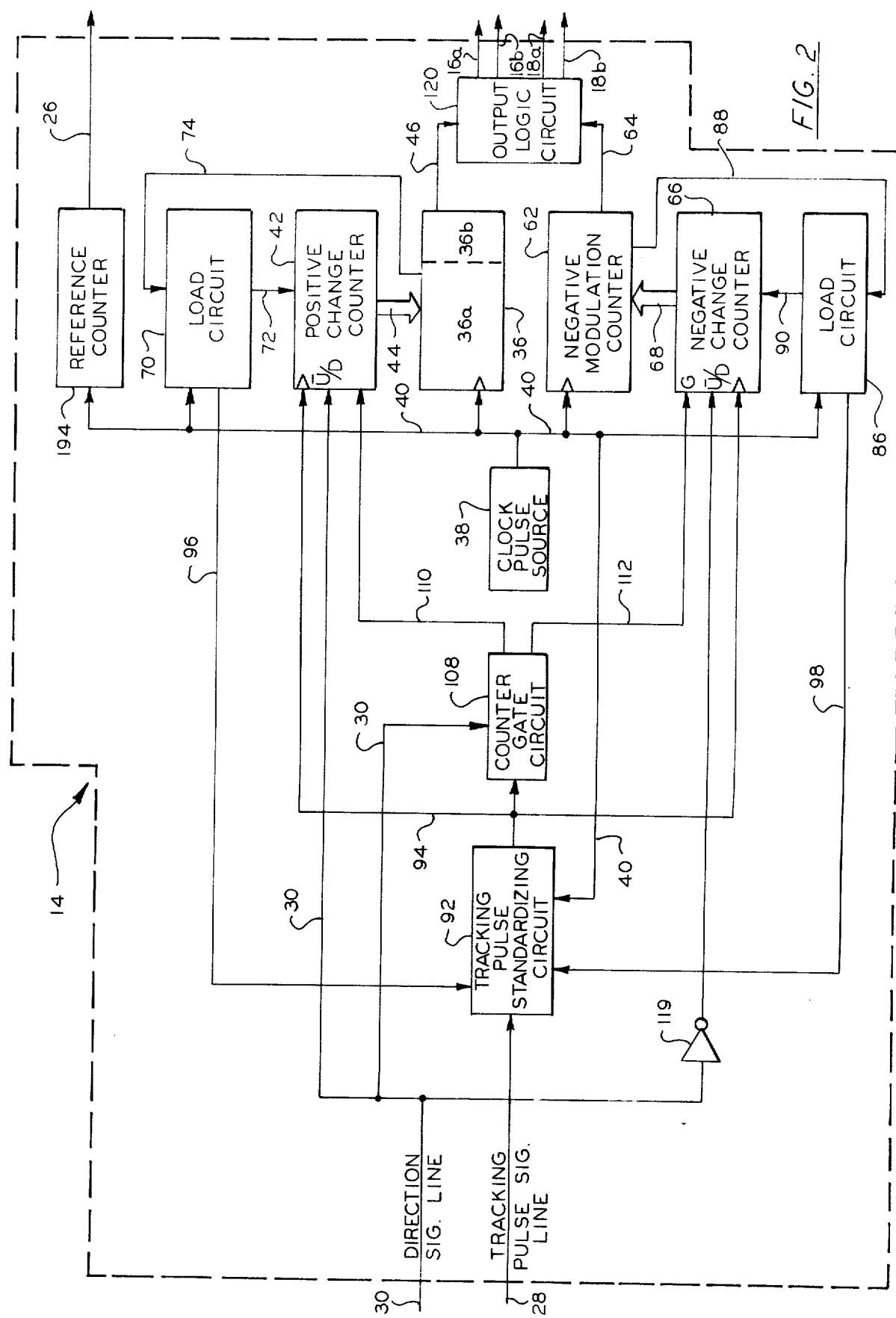
FIG. 2 is a schematic block diagram of a preferred embodiment of the pulse-width modulator 14 of FIG. 1.

Referring now to FIG. 2, the modulator 14 is comprised of a positive modulation counter 36 having a clock input connected to a clock source 38 through a signal line 40. The clock source 38 alternately provides ONE and ZERO at a clock frequency to the counter 36.

The counter 36 is of a type which is comprised of a first group of stages 36a having a lower significance and a second group of stages 36b having a higher significance. A signal representation of a positive base number is provided to the stages 36a by a positive change counter 42 through a plurality of signal lines 44.

The stages 36a store lower order signals representative of a lower order number which is incremented (by one) in response to a clock pulse. When counter 36a has stepped through a predetermined range the stages 36a are loaded in response to a clock pulse whereby the contents of counter stage 36a are changed to a representation of a predetermined positive base number. The positive base number is representative of a positive portion of the cumulative difference between the least increases and least decreases during a time interval between successive loadings of the stages 36a. Accordingly, the positive base number is associated with either an increase or a decrease of the actual displacement.

After the stages 36a are loaded, the counter 42 is reset.

The stages 36a are connected to the stages 36b whereby the contents of counter 36a are provided to the stages 36b. As described hereinafter, the stages 36b store higher order signals representative of a higher order number which is incremented in concurrent response to a clock pulse and the stage 36a reaching its predetermined maximum count.

The output of the counter 36a is provided by a most significant stage of the stages 36b on a signal line 46. When the higher order signals are representative of a number less than a maximum number, the counter 36 provides ZERO; ONE is provided when the higher order signals are representative of the maximum number.

The signals representative of the maximum number are changed to a signal representation of zero in response to the stages 36b being incremented whereby the output of the counter 36 changes from ONE to ZERO. Accordingly, ONEs are periodically provided on the line 46 whereby the counter 36 provides a positive modulator pulse train.

Loading the stages 36a to store lower order signals associated with an increase of the actual displacement causes a decrease in the number of clock pulses which cause the storage of the lower order signals representative of the modulus number. The decrease in the number of clock pulses causes a positive time displacement of the positive modulator pulse train.

Loading the stages 36a to provide lower order signals associated with a decrease of the indicated displacement causes an increase in the number of clock pulses which cause the storage of the lower order signals representative of the modulus number. The increase in the number of clock pulses causes a negative time displacement of the positive modulator pulse train.

As explained hereinafter, a time displacement of the positive modulator pulse train causes a corresponding change of the sine and the cosine pulse trains.

The modulator 14 additionally includes a negative modulation counter 62 (similar to the counter 36) having a clock input connected to the source 38 through the line 40. The counter 62 provides a negative modulator pulse train on a signal line 64 as explained hereinafter.

The counter 62 is connected to a negative change counter 66 (similar to the counter 42) through a plurality of signal lines 68 whereby a signal representation of a negative base number is provided to lower order stages of the counter 62. The negative base number is representative of a negative portion of the cumulative difference between the least increases and least decreases.

A negative base number associated with a decrease of the indicated displacement causes a negative time displacement of the negative modulator pulse train. Correspondingly, a negative base number associated with an increase of the indicated displacement causes a positive time displacement of the negative modulator pulse train.

The positive and the negative base numbers have a difference therebetween representative of the partial cumulative difference between the least increases and the least decreases. Because the positive and the negative modulator pulse trains have time displacements which change in response to the signal representations of the positive and the negative base numbers, respectively, the positive and the negative modulator pulse trains have a time displacement therebetween which correspond to the indicated angle.

The counter 42 is connected to a load circuit 70 at a load output thereof through a signal line 72. When the load output of the circuit 70 provides ZERO, the counter 42 is loaded to store the signal representation of the base reference number (which is thereby provided to the stages 36a).

The circuit 70 has a first input connected to a modulus output of the stages 36a through a signal line 74. When the stages 36a do not store lower order signals representative of the maximum range, the modulus output of the stages 36a provides ONE to the circuit 70; when the lower order signals are representative of the maximum number, the modulus output provides ZERO.

A second input of the circuit 70 is connected to the clock source 38 via the line 40 whereby clock pulses are provided to the circuit 70.

Figure 4:
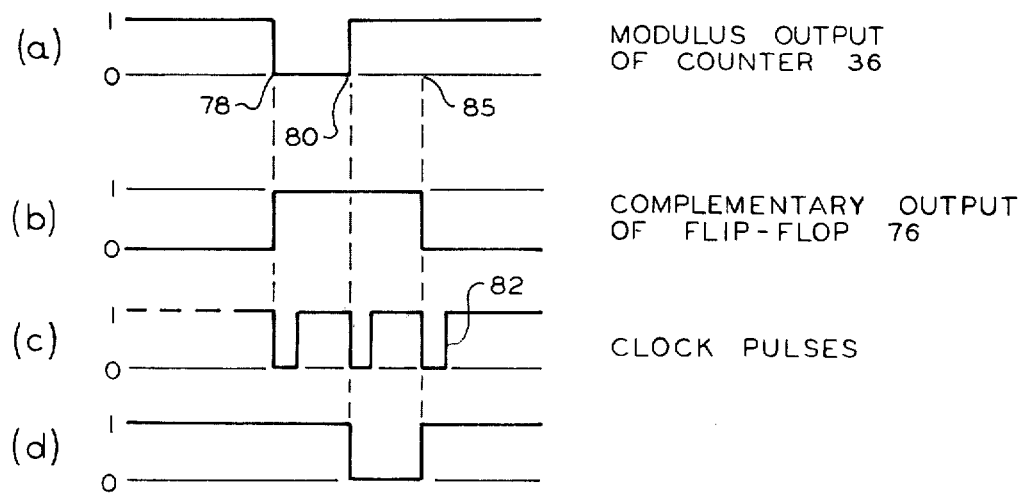
FIG. 4 is a timing diagram of logic signals, all on a common time base, associated with the load circuit of FIG. 3.
Figure 3:
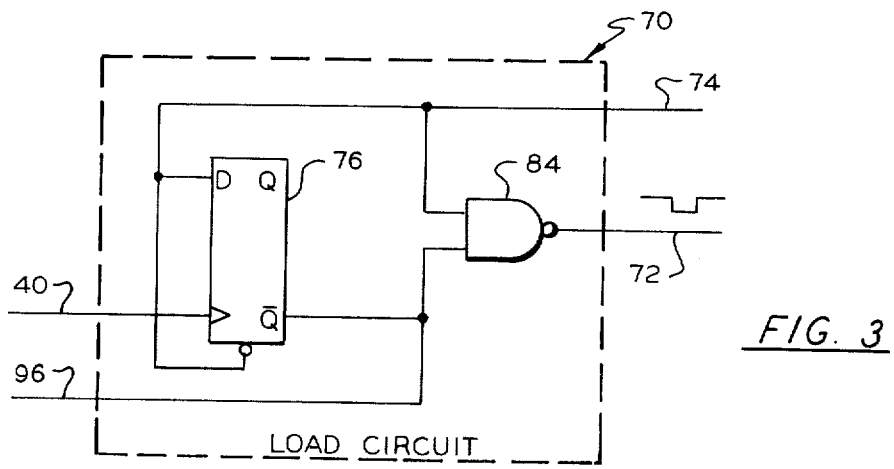
FIG. 3 is a schematic diagram of a load circuit included in the modulator circuit of FIG. 2.

Referring now to FIGS. 3 and 4, the load circuit 70 is comprised of a D Flip-flop 76 having a D input and an asynchronous reset input connected to the line 74 whereby the modulus output of the stages 36a is connected to the flip-flop 76. A clock input of the flip-flop 76 is connected to the clock source 38 via the line 40.

As known to those skilled in the art, in response to ZERO being provided to an asynchronous reset input of a D flip-flop, ONE is provided at a complementary output thereof; when ONE is provided to the asynchronous reset input (or when the D flip-flop does not have an asynchronous reset input), a clock pulse causes the complementary output to provide a logic signal which is the complement of the logic signal provided to the D input. It should be understood that the complement of ZERO is ONE and vice-versa.

FIG. 4, illustration (a) is a representation of a waveform of the logic signals provided by the modulus output of the stages 36a. The stages 36a store lower order signals representative of the modulus number during a time represented by a displacement between points 78, 80 whereby ZERO is provided through the line 74 and ONE is provided at a complementary output of the flip-flop 76.

Illustration (b) is a representation of a waveform of logic signals provided by the complementary output of the flip-flop 76. After the time represented by the point 80, ONE is provided through the line 74 whereby a clock pulse, represented in illustration (c) by a waveform 82, causes ZERO to be provided by the complementary output of the flip-flop 76 (illustration (b)).

The complementary output of the flip-flop 76 is connected to a NAND gate 84 at one of two inputs thereof, the other input being connected to the line 74 whereby the modulus output of the stages 36a is connected to the NAND gate 84. The output of the NAND gate 84 (which is the load output of the circuit 70) is connected to the line 72.

As known to those skilled in the art, an NAND gate provides ZERO in concurrent response to ONEs being provided to the inputs thereof. During a time represented by an interval between the point 80 and a point 85, ONEs are concurrently provided to the NAND gate 84 through the line 74 and by the complementary output of the flip-flop 76. Accordingly, illustration (d) is of waveform representative of the output of the NAND gate 84.

Referring to FIG. 2, a load circuit 86 (similar to the load circuit 70) has first and second inputs thereof respectively connected to the modulus output of the counter 62 through a signal line 88 and the clock source 38 through the line 40.

A load output of the circuit 86 is connected to the counter 66 through a signal line 90. The counter 66 is loaded to store the signal representation of the base reference number in a manner similar to the loading of the counter 42 described hereinbefore.

The counter 42 is of a well known type which may be either incremented or decremented thereby providing signal representations of positive base numbers which are respectively increased or decreased.

The incrementing or the decrementing of the counter 42 is provided in response to the concurrent provision of ONE on line 110 (FIG. 2) at a gate logic input and a standardized tracking pulse input on line 94, respectively, of the counter 42. The incrementing is provided in response to the additional concurrent provision of ZERO to an UP/DOWN input of the counter 42 on line 30; decrementing is provided in response to ONE being provided to the UP/DOWN input on line 30.

In a manner similar to the incrementing and decrementing of the counter 42, the counter 66 may be either incremented or decremented.

It should be appreciated that the counters 42, 66 are of a type which cannot be simultaneously loaded and incremented (or decremented). Additionally, the occurrence of the tracking pulse is unsynchronized with the loading of the counters 42, 66. Because the occurrence of the tracking pulse is unsynchronized, provided in response thereto is the standardized tracking pulse which does not occur when either the counter 42 or the counter 66 is being loaded.

The standardized tracking pulse inputs of the counters 42, 66 are connected to the output of a tracking pulse standardizing circuit 92 through a signal line 94. The standardizing circuit 92 has an input connected to the line 28 whereby the tracking pulse is provided to the standardizing circuit 92. Additionally, the standardizing circuit 92 has a pair of inputs connected to the complementary output of the flip-flop 76 (FIG. 3) and the complementary output of a flip-flop 76 (FIG. 3) and the complementary output of a flip-flop (not shown) in the load circuit 86 through signal lines 96, 98, respectively. Accordingly, in response to either the counter 66 being loaded, ONE is respectively provided through the lines 96, 98. Additionally, the standardizing circuit 92 has a clock input connected to the clock source 38 via the line 40.

Figure 5:
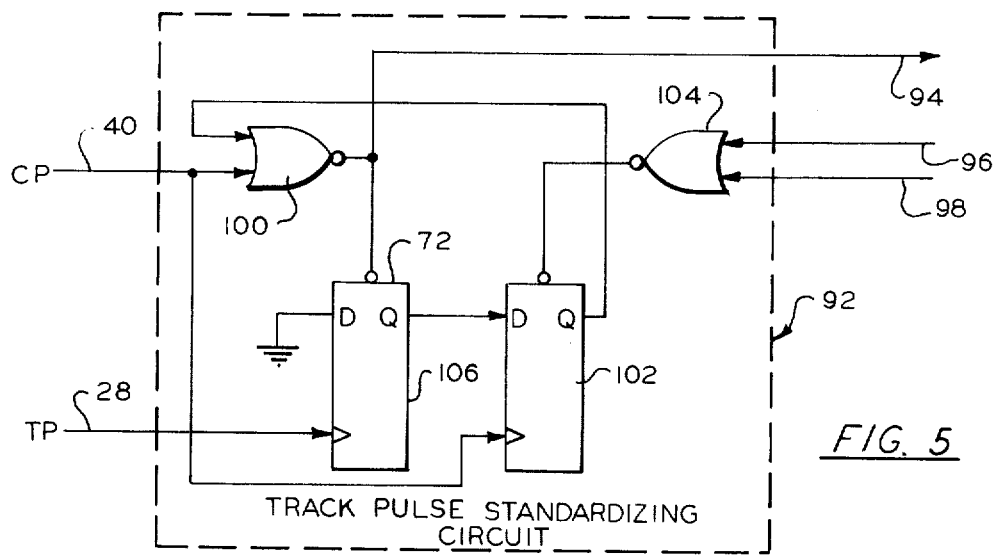
FIG. 5 is a schematic diagram of a tracking pulse standardizing circuit included in the modulator circuit of FIG. 2.

Referring now to FIG. 5, the standardizing circuit 92 is comprised of an OR gate 100 having one input connected to the line 40 and another input connected to the true output of a D flip-flop 102. The output of the OR gate 100 is connected to the line 94.

As known to those skilled in the art, an OR gate provides ONE in response to ONE being provided to an input thereof. Accordingly, when ONE is provided by the flip-flop 102, a steady ONE is provided at the output of the OR gate 100 thereby inhibiting the transmission of a clock pulse therethrough. When ZERO is provided by the flip-flop 102, a clock pulse provided on the line 40 is transmitted through the OR gate 100 to the output thereof whereby the standardized tracking pulse is provided to the counters 42, 66.

The flip-flop 102 has an asynchronous set input 103 and a clock input respectively connected to the output of a NOR gate 104 and to the clock source 38 through the line 40. As known to those skilled in the art, in response to ZERO being provided to the asynchronous set input of a D flip-flop, ONE is provided at a true output thereof; when ONE is provided to the asynchronous set input (or when the D flip-flop does not have an asynchronous set input) a clock pulse causes the true output to provide a logic signal which is the same as the logic signal provided to the D input.

The NOR gate 104 has two inputs respectively connected to the circuits 70, 86 through the lines 96, 98. A NOR gate is a well known circuit which provides ZERO in response to ONE being provided to an input thereof. Accordingly, when either the counter 42 or the counter 66 is being loaded, ONE is provided to the NOR gate 104 whereby ZERO is provided to the asynchronous set input of the flip-flop 102 thereby inhibiting the transmission of the standardized tracking pulse through the OR gate 100.

The D input of the flip-flop 102 is connected to a D flip-flop 106 (similar to the flip-flop 102) at a true output Q thereof. The flip-flop 106 has an asynchronous set input connected to the output of the OR gate 100 whereby ONE is provided by the flip-flop 106 in response to the standardized tracking pulse. Additionally, the flip-flop 106 has a D input and a clock input respectively connected to ground and to the line 28 whereby the tracking pulse causes the flip-flop 106 to provide ZERO (when ONE is provided by the OR gate 100).

In response to ZERO being provided by the flip-flop 106, a clock pulse causes the flip-flop 102 to provide ZERO whereby the OR gate 100 is conditioned to provide a succeeding standardized tracking pulse in response to a succeeding tracking pulse.

Referring to FIG. 2, the output of the standardizing circuit 92 is additionally connected to a counter gate circuit 108 at one input thereof through the signal line 94 whereby the standardized tracking pulse is provided to the gate circuit 108. Another input of the gate circuit 108 is connected to the line 30 whereby the direction signal is provided to the gate circuit 108.

The gate circuit 108 has first and second outputs connected to the gate inputs of the counters 42, 66 through signal lines 110, 112, respectively. As explained hereinafter, complementary related logic signals are provided at the first and second outputs of the gate circuit 108 whereby either the counter 42 or the counter 62 (but not both) is either incremented or decremented in response to the standardized tracking pulse.

Figure 6:
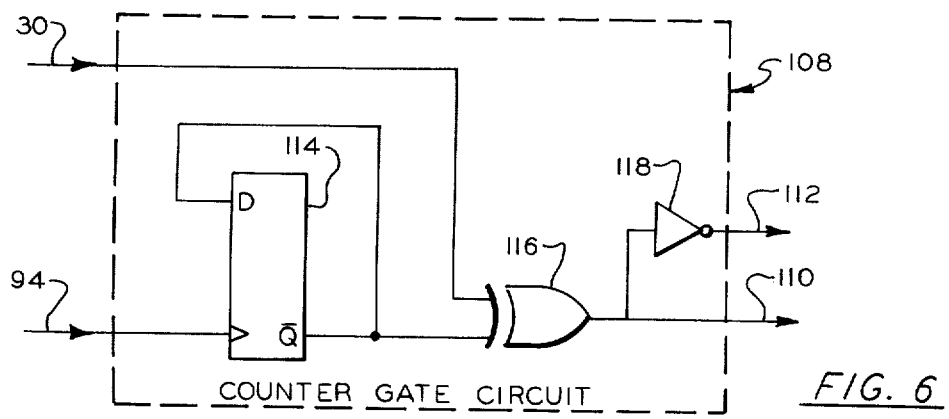
FIG. 6 is a schematic diagram of a counter gate circuit included in the modulator circuit of FIG. 2.

Referring now to FIG. 6, the gate circuit 108 is comprised of a D flip-flop 114 having a clock input from line 94 and a D input connected to the complementary output Q of the flip-flop 114. In accordance with the explanation of a D flip-flop provided hereinbefore, the logic signal provided at the complementary output of the flip-flop 114 is changed in response to the standardized tracking pulse. That is to say, when the output of the flip-flop 114 provides ONE, it is changed to ZERO and vice versa.

The Q output of the flip-flop 114 is connected to one input of an EXCLUSIVE OR circuit 116, the other input being connected to the line 30 whereby the direction signal is provided to the EXCLUSIVE OR gate 116.

As is known to those skilled in the art, an EXCLUSIVE OR gate provides ONE in response to complementary related logic signals being respectively provided to the inputs thereof. Since the logic signal provided by the flip-flop 114 changes in response to the standardized tracking pulse, the output of the EXCLUSIVE OR gate 116 alternately provides ONE and ZERO in response to successive standardized tracking pulses (when the direction signal remains unchanged).

The output of the EXCLUSIVE OR gate 116 is connected to the line 110 whereby the EXCLUSIVE OR gate 116 provides a gate logic signal to the gate logic input of the counter 42. Additionally, the output of the EXCLUSIVE OR gate 116 is connected to an inverter 118 at the input thereof.

An inverter is a well known circuit for providing a logic signal which is the complement of a logic signal provided to the input thereof. The output of the inverter 118 is connected to the signal line 112 whereby the inverter 118 provides a gate logic signal to the gate logic input of the counter 66.

Referring to FIG. 2, the UP/DOWN input of the counter 42 is connected to the line 30 whereby the counter 42 may be incremented in response to the standardized tracking pulse being caused by a least decrease of the indicated angle.

The line 30 is additionally connected to the input of an inverter 119, the output thereof being connected to the UP/DOWN input of the counter 66. Accordingly, when the direction signal is ZERO, the counters 42, 66 are respectively incremented and decremented in response to a pair of successive standardized tracking pulses; when the direction signal is ONE, the counters 42, 66 are respectively decremented and incremented in response to the pair of successive standardized tracking pulses.

Thus there has been described a pulse-width modulator circuit where modulator counters are periodically loaded to provide a change of time displacement between corresponding portions of modulator pulse trains. Because of the periodic loading, the carrier frequency of the modulator pulse trains is higher than frequencies utilized in comparable indicating systems of the prior art.

Referring to FIG. 2, the counters 36, 62 are connected to an output logic circuit 120 through the lines 46, 64, respectively whereby the modulator pulse trains are provided to the output logic circuit 120. In response to the modulator pulse trains, the output logic circuit 120 provides the sine and the cosine current pulse trains referred to hereinbefore.

Figure 7:
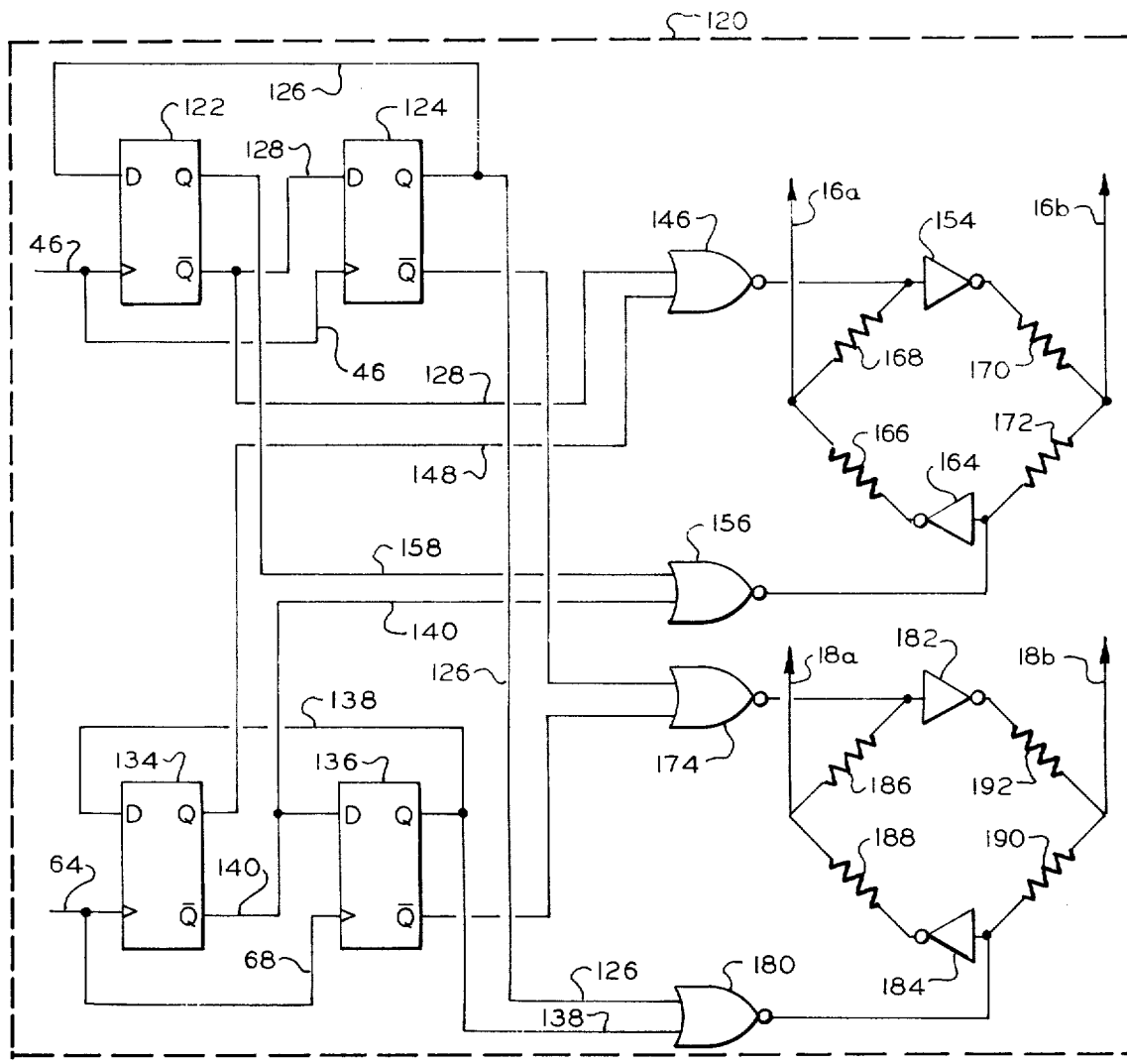
FIG. 7 is a schematic diagram of an output logic circuit included in the modulator circuit of FIG. 2.
Figure 8:
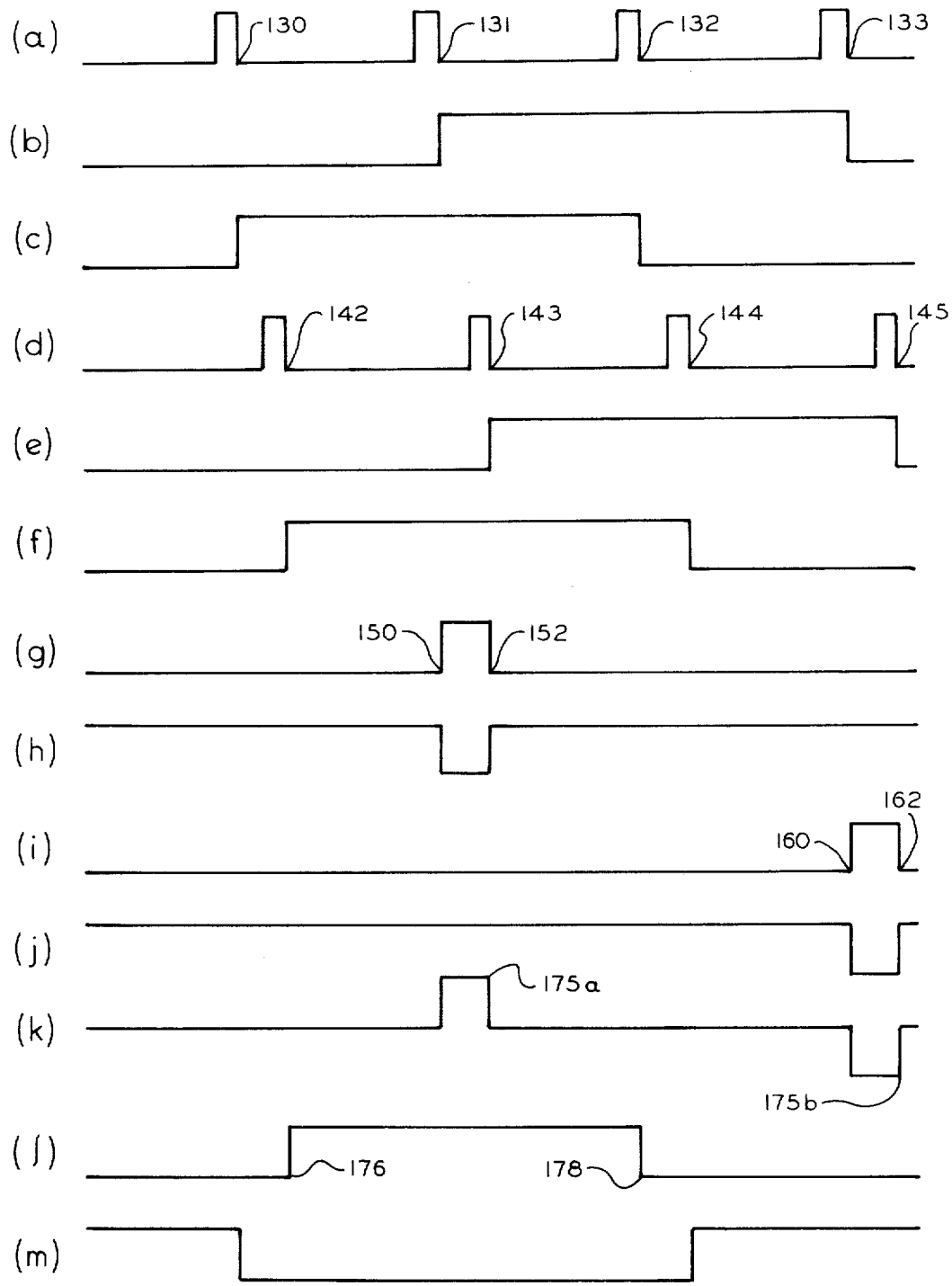
FIG. 8 is a timing diagram of logic signals, all on a common time base, associated with the output logic circuit of FIG. 7 during a cycle of operation.

Referring now to FIGS. 7 and 8, in the output logic circuit 120, the line 46 is connected to D flip-flops 122, 124 at clock inputs thereof whereby the positive modulator pulse train is provided to the flip-flops 122, 124. Additionally, a true output of the flip-flop 124 is connected to a D input of the flip-flop 122 through a signal line 126 and a D input of the flip-flop 124 is connected to a complementary output of the flip-flop 122 through a signal line 128.

Illustration (a) is of a waveform representative of the positive modulator pulse train. It should be understood that in response to the positive modulator pulse train providing a transition from ONE to ZERO, there may be a change in the logic signals provided by the flip-flops 122, 124.

Illustrations (b) and (c) are of waveforms respectively representative of a true output of the flip-flop 122 and the true output of the flip-flop 124. At a time represented by a point 130, the true output of the flip-flop 124 changes from ZERO to ONE because of ONE being provided to the D input thereof by the flip-flop 122 concurrently with a transition of the positive modulator pulse train.

At a time represented by a point 131 the true output flip-flop 122 changed from ZERO to ONE because of ONE being provided to the D input thereof by the flip-flop 124 concurrently with a transition of the positive modulator pulse train.

The true output of the flip-flop 124 changes from ONE to ZERO at a time represented by a point 132 because of ZERO being provided to the D input thereof by the flip-flop 122 concurrently with a transition of the positive modulator pulse train.

At a time represented by a point 133, the true output of the flip-flop 122 changes to provide ZERO because of ZERO being provided to the D input thereof by the flip-flop 124 concurrently with a transistion of the positive pulse train.

Similar to the line 46, the line 64 is connected to the flip-flops 134, 136 at clock inputs thereof whereby the negative modulator pulse train is provided to the flip-flops 134, 136. The flip-flops 134, 136 are connected in a manner similar to the connection of the flip-flops 122, 124 whereby a true output of the flip-flop 136 is connected to a D input of the flip-flop 134 through a signal line 138. Additionally, a D input of the flip-flop 136 is connected to a complementary output of the flip-flop 134 through a signal line 140.

In accordance with the explanation given hereinbefore, it should be understood that the outputs of the flip-flops 134, 136 may change in response to a transition from ONE to ZERO of the negative nodulator pulse train.

Illustration (d) is of a waveform representative of the negative modulator pulse train. The waveforms of illustrations (a) and (d) have a time displacement between corresponding portions thereof along a direction defined by a time base. The time base displacement is representative of the time displacement between corresponding portions of the modulator pulse trains. Because of the time base displacement, the points 130-133, (illustration (a)) respectively correspond to points 142-145 (illustration (d)).

Illustrations (e) and (f) are of waveforms respectively representative of a true output of the flip-flop 134 and the true output of the flip-flop 136. Because the flip-flops 124, 136 provide logic signals which change in response to transitions of the positive and negative modulator pulse trains, respectively, corresponding portions of the waveforms of illustration (b) and (e) have the time base displacement therebetween. For the same reason, corresponding portions of the waveforms of illustrations (c) and (f) have the time base displacement therebetween.

The complementary output of the flip-flop 122 and the true output of the flip-flop 134 are connected to a NOR gate 146 at respective inputs thereof through the line 128 and a signal line 148. Accordingly, the NOR gate 146 provides logic signals represented by a waveform of illustration (g). It should be understood that because the flip-flops 122, 134 provide logic signals respectively represented by waveforms with the time base displacement between corresponding portions thereof, a displacement between points 150, 152 equals the time base displacement.

The output of the NOR gate 146 is connected to an inverter 154 at an input thereof whereby the output of the inverter 154 provides logic signals which are represented by a waveform of illustration (h). As explained hereinafter, the NOR gate 146 and the inverter 154 are utilized for providing a train of current pulses having a pulse-width proportional to the time displacement whereby the sine output pulse train is provided by the modulator 14 (FIG. 2).

The true output of the flip-flop 122 and the complementary output of the flip-flop 134 are connected to a NOR gate 156 at respective inputs thereof through the line 140 and a signal line 158. Accordingly, the NOR gate 156 provides logic signals represented by a waveform of illustration (i). For reasons stated hereinbefore, displacement between points 160, 162 equals the time base displacement.

The output of the NOR gate 156 is connected to an inverter 164 at an input thereof whereby the output of the inverter 164 provides logic signals which are represented by a waveform of illustration (j).

The output of the inverter 164 and the output of the NOR gate 146 are respectively connected through resistors 166, 168 to the line 16a. Additionally, the output of the inverter 154 and the output of the NOR gate 156 are respectively connected through resistors 170, 172 to the line 16b.

It should be understood that the output of the NOR gate 146 (illustration (g)) and the output of the inverter 164 (illustration (j)) both provide ONE during a time represented by the displacement between the points 150, 152. Additionally, while the NOR gate 146 and the inverter 164 both provide ONE, the output of the inverter 154 (illustration (h)) and the output of the NOR gate 156 (illustration (i)) both provide ZERO. Accordingly, during the time represented by the displacement between the points 150, 152 a positive current pulse flows from the NOR gate 146 and the inverter 164 through the resistors 166, 168, respectively, through the line 16a to the transducer 10 (FIG. 1). The positive current pulse is returned through the line 16b to the NOR gate 156 and to the inverter 154 via the resistors 172, 170, respectively.

In a similar manner, a negative current pulse flows from the NOR gate 156 and the inverter 154 through the line 16b to the transducer 10 during a time represented by the displacement between the points 160, 162. The negative current pulse is returned through the line 16a to the NOR gate 146 and the inverter 164.

Illustration (k) is a representation of the current pulses provided to the transducer 10 via the lines 16a, 16b during a carrier frequency cycle. Included therein are waveforms 175a, 175b which are representative of the positive and the negative current pulses, respectively. Because the pulse-width of the current pulses is proportional to the indicated angle, the current provided via the line 16a, 16b has a carrier frequency component with an amplitude proportional to the sine of the indicated angle. Accordingly, the same train of current pulses is provided via the lines 16a, 16b.

It should be understood that because positive and negative current pulses are provided, the sine pulse train does not include an even harmonic frequency component. As explained hereinafter, an even harmonic frequency component is not included in the cosine train of current pulses. Because an even harmonic component is not included in either the sine or cosine pulse trains, the error pulse train does not include an even harmonic component, thereby simplifying the filtering of the error pulse train.

In providing the cosine pulse train, the Q outputs of the flip-flops 124, 126 are connected to a NOR gate 174 at respective inputs thereof. Accordingly, the NOR gate 174 provides logic signals represented by a waveform of illustration (1). It should be understood that during a cycle of the carrier frequency, the sum of the time durations of the provision of ONE by the NOR gates 146, 174 equals a constant for all time displacements between corresponding portions of the modulator pulse trains, Additionally, when the indicated angle is 45° the gates 146, 174 provide ONE simultaneously. Accordingly, a displacement between points 176, 178 is representative of an angle which is the complement of the indicated angle.

The true outputs of the flip-flops 124, 136 are connected to a NOR gate 180 at respective inputs thereof through the lines 126, 138. Accordingly, the NOR gate 180 provides logic signals represented by a waveform of illustration (m). It should be understood that during a cycle of the carrier frequency, the NOR gates 174, 180 provide ONE during respectively equal time durations.

The outputs of the NOR gates 174, 180 are resepectively connected to inverters 182, 184 at the inputs thereof. The output of the NOR gate 174 and the output of the inverter 184 are respectively connected through the resistors 186, 188 to the line 18a. Additionally, the output of the NOR gate 180 and the output of the inverter 182 are respectively connected through resistors 190, 192 to the line 18b. Because the displacement between the points 176, 178 is representative of the angle which is the complement of the indicated angle, the cosine pulse train is provided to the transducer 10 through the lines 18a, 18b.

The modulator 14 (FIG. 2) additionally includes a reference counter 194 which has an input connected to the clock source 38 through the line 40. In response to the clock pulses, the reference counter 194 provides a pulse train ONEs and ZEROs) at the carrier frequency on the line 26 whereby the reference signal is provided to the tracking pulse generator 22 (FIG. 1).

According to one modification of the specific embodiment of the present invention, the clock pulse frequency is 4 megahertz and the carrier frequency is 4 kilohertz. Accordingly, the reference counter 194 provides a pulse (either ONE or ZERO) in response to the clock source 38 providing 1000 clock pulses. As explained hereinafter, one cycle of the carrier frequency components of the sine and cosine pulse trains is provided in response to 1000 clock pulses.

In this modification of the embodiments of the invention the base reference number loaded into state 36a is 206, and the stage 36a has a maximum count (modulus number) of 256. Thus, a signal representation of the modulus number is typically provided once in response to 50 clock pulses. It should be appreciated that when the stages 36a are loaded to store a signal representation of a positive base number different from the base reference number, the signal representation of the modulus number is provided in response to a number of clock pulses different from the number, 50. In a similar manner, the signal representation of the modulus number is provided by the lower order stages of the counter 62 in response to a number of clock pulses different from the number, 50.

In this embodiment of the output of stage 36b appears in response to that stage being incremented five times. Since the signal representation of the modulus number is typically provided once in response to 50 clock pulses, one pulse of the positive modulator pulse train is typically provided in response to 250 clock pulses. In a similar manner, the counter 62 provides the negative modulator pulse train.

Referring to FIG. 8, illustrations (a) and (d), one pulse of the sine pulse train and one pulse of the cosine pulse train are provided in response to four pulses of the positive modulator pulse train and four pulses of the negative modulator pulse train, respectively. Since one pulse of the positive and negative modulator pulse trains is typically provided in response to 250 clock pulses, one pulse of the sine pulse train and one pulse of the cosine pulse train is typically provided in response to 1000 clock pulses. Because the clock pulse frequency of this described embodiment is 4 megahertz, pulses of the sine pulse train and pulses of the cosine pulse train are provided at the 4 kilohertz carrier freqeuency.

Accordingly, the tracking pulse causes a change 1/1000 of a carrier frequency cycle in the time dislacement between the positive and the negative modulator pulse trains. Hence, the tracking pulse is representative of a change in the actual displacement of 1/1000 of a transducer of the transducer 10 (FIG. 1). When the transducer cycle equals 0.2 inches, the tracking pulse is representative of a change of 0.0002 inches.

Figure 9:
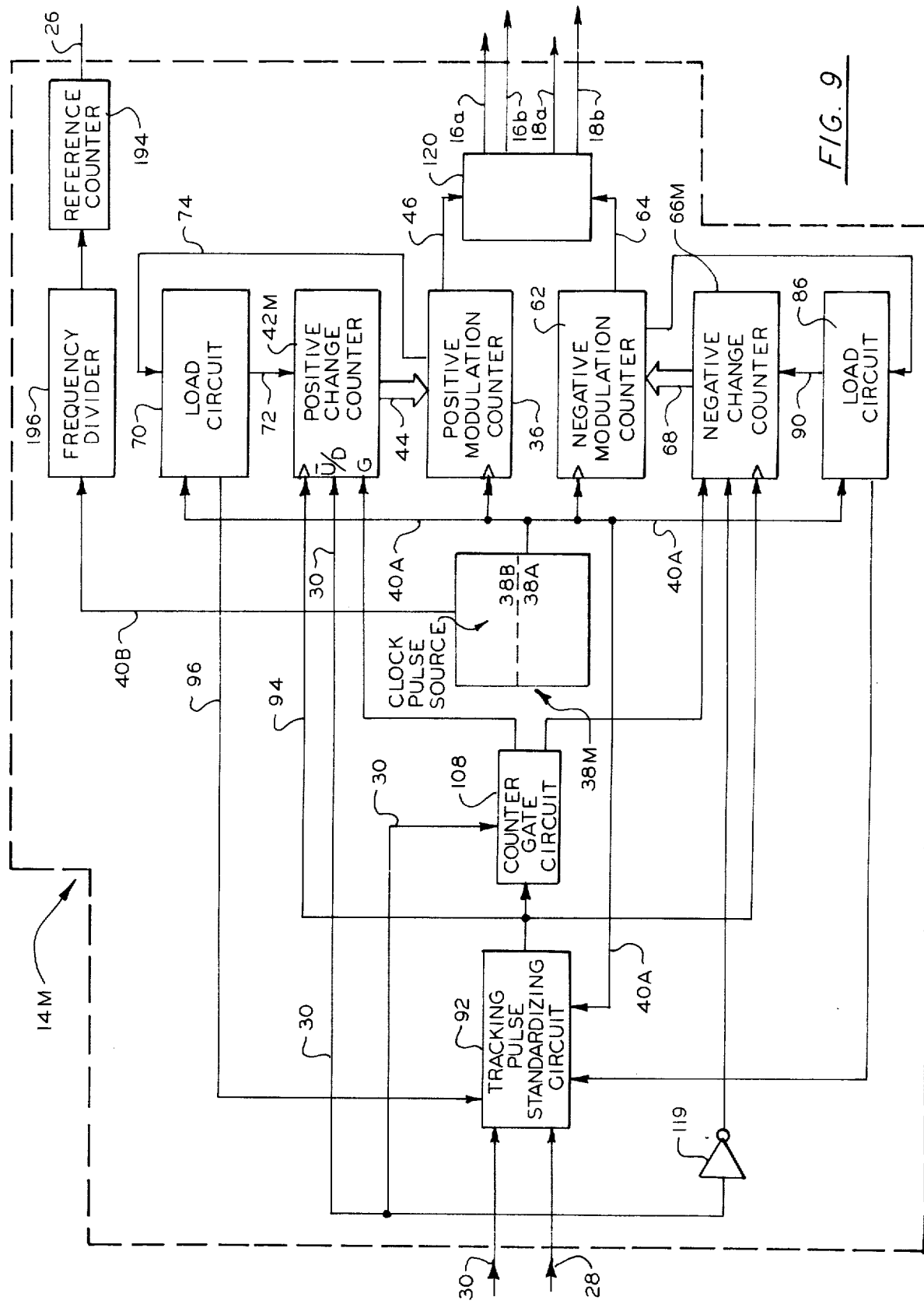
FIG. 9 is a block diagram of a modulator circuit corresponding to the modulator circuit 14 of FIG. 2 modified in accordance with the invention.

Referring now to FIG. 9, in accordance with a mofication of the preferred embodiments of the invention, a modified modulator circuit 14M provides a pulse of a positive modulator pulse train and a pulse of a negative modulator pulse train in response to 2540 clock pulses. Since the above-mentioned transducer cycle equals 0.2 inches and there are 2.54 centimeters per inch, a tracking pulse is representative of a change in the actual displacement of 1/2540 of the transducer cycle (0.0002 centimeters).

In the modulator 14M, a clock pulse source 38M has stages 38A which provide low order clock pulses at a first clock pulse frequency of 10 megahertz. The stages 38A are connected to stages 38B which provide selected ones of the low order clock pulses whereby higher order clock pulses are provided at a second clock pulse frequency of 4 megahertz. The clock source 38M is of a type well known in the art.

The stages 36A are connected to the counters 36, 62 and the the load circuits 70, 86 through a signal line 40A whereby the clock pulses are provided thereto at the first clock pulse frequency. The stages 38B are connected to a frequency divider 196 through a signal line 40B whereby clock pulses are provided thereto at the second clock pulse frequency.

The modulator 14M, further includes a positive change counter 42M and a negative change counter 66M which provide a signal representation of a base reference number equal to the number, 129. Accordingly, the signal representation of the modulus number is typically provided (to the stages 36B and the higher order stages of the counter 62) once in response to 127 clock pulses (instead of 50 clock pulses as in the modulator 14 of the previously described embodiment). Therefore, one pulse of the sine pulse train and one pulse of the cosine pulse train is typically provided in response to 2,540 clock pulses (since 2,540=1000×127/50).

Since the first clock pulse frequency is 10 megahertz, the carrier frequency is 3,937 kilohertz (because 3,937=10×106/2,540). The frequency divider circuit 196 referred to hereinbefore provides a fraction of the clock pulses provided thereto by the stages 38B whereby the counter 194 receives clock pulses at a frequency of 3.937 megahertz and therefore provides a pulse train at the carrier frequency of 3.937 kilohertz.

Figure 10:
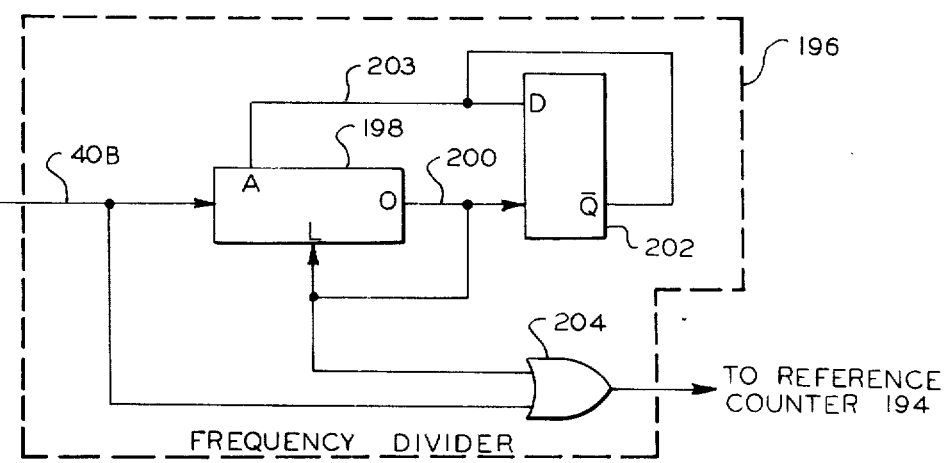
FIG. 10 is a clock pulse divider circuit included in the modified modulator circuit of FIG. 9.

Referring now to FIG. 10, the frequency divider 196 is comprised of a counter circuit 198 having a clock input connected to the line 40B whereby clock pulses are provided to the counter 198 at the second clock pulse frequency of 4 megahertz.

The counter 198 is of the type which has a lowest order asynchronous input (A) and a load input (L). When ZERO is provided to the load input (L), the counter 198 successively stores signal representations of the numbers, 0-63, in response to 63 clock pulses, respectively. When ONE is provided to the load input (L), a lowest order stage of the counter 198 is loaded in response to a clock pulse whereby the lowest order stage of the counter provides the signal provided to the asynchronous input (A). ONE is provided at the output (0) of the counter 198 when the signal representation of the number, 63, is stored. The output (0) of the counter 198 is connected to the load input (L) thereof through a signal line 200 whereby ONE is provided to the load input (L) when the counter 198 stores a signal representation of the number 63.

The asynchronous input (A) is connected to a D flip-flop 202 at a complementary output thereof through a signal line 203. As explained hereinafter, the flip-flop 202 alternately provides ONE and ZERO in response to the counter 198 successively providing signal representations of the number, 63.

When the complementary output of the flip-flop 202 provides ONE, and the counter 198 stores a signal representation of the number, 63, the counter 198 stores a signal representation of the number, one, in response to a clock pulse. Therefore, when the flip-flop 202 provides ONE, the counter 198 successively provides the signal representations of the number, 63, in response to 63 clock pulses.

When the flip-flop 202 provides ZERO, and the counter 198 provides a signal representation of the number, 63, the counter 198 stores a signal representation of the number, zero, in response to a clock pulse. Therefore, when the flip-flop 202 provides ZERO the counter 198 successively provides signal representations of the number, 63 in response to 64 clock pulses.

The lines 200, 40B are connected to an OR gate 204 at respective inputs thereof. The output of the OR gate 204 is connected to the input of the counter 194. In response to ONE being provided on the line 200, the OR gate 204 is inhibited from providing a clock pulse to the counter 194. Accordingly, the OR gate 204 provides a fraction, 125/127, of the 4 MHz clock pulses provided on the line 40B thereby providing clock pulses at the frequency of 3.937 megahertz.

Thus there have been described an unmodified and a modified version of a specific embodiment of the present invention. In each version an improved pulse-width modulator has been shown for generating modulation pulses representative of the relative change of position of transducer elements, the modulator being so arranged that a cumulative number of least differences of displacement is periodically loaded into two modulation counters to alter the modulator output and effectively increase the information rate of the measurement system. Also in each version a predetermined base reference number has been periodically loaded into the modulation counters in order to determine a particular measurement system with which the least difference of the transducer element is to be associated. In the unmodified version the transducer displacement is indicated in imperial (inch) units; inn the modification of the embodiment described the base reference number is altered to give a displacement indication in metric units.

Although the invention has been described with respect to a specific embodiment thereof, it should be understood by those skilled in the art that various changes in the form and detail thereof may be made without departing from the scope of the invention.

What is claimed is:

1. In a position measurement system having a position measurement transducer and means responsive to said transducer for generating a tracking pulse representative of a least change in the position of two relatively movable members of said transducer, further having a pulse-width modulator responsive to said tracking pulse for providing to said transducer an output pulse having a pulse-width proportional to said position, said modulator including a clock pulse source which provides clock pulses to first and second modulation counters of a type which stores a signal representation of a number which is increased in response to a clock pulse and provides a modulator pulse concurrently with storing a signal representation of a predetermined maximum number, said modulation counters being connected to an output circuit which provides a sine output pulse having a pulse-width proportional to a time displacement between corresponding portions of said first and second modulator pulses, the improvement comprising:

positive accumulation means responsive to said tracking pulse for storing a signal representation of a positive base number which is changed in response to a tracking pulse, said positive base number being representative of a cumulative change of said position; and loading means responsive to said positive accumulation means for loading said first modulation counter to store in said first modulation counter said signal representation of a positive base number, whereby the pulse-width of said sine output pulse is altered by an amount proportional to said cumulative change of said position in a predetermined measurement system.

2. A position measurement system according to claim 1 wherein said loading means further comprises circuit means for loading said first modulation counter to store a predetermined reference number signal representation associated with a predetermined measurement system whereby a least change in said output sine pulse is proportional to one unit in said measurement system.

3. A position measurement system according to claim 1 wherein said first modulation counter includes higher order stages and lower order stages which respectively provide higher order and lower order signals, said signals being respectively representative of a lower order number which is increased in response to a clock pulse and a higher order number which is increased in response to said lower order stages providing a lower order signal representation of a modulus number, said loading means comprising:

means for loading said lower order stages to store said positive base number signal representation in response to said signal representation of said modulus number.

4. A position measurement system according to claim 3 wherein said positive base number is increased and decreased in response to tracking pulses respectively representative of an increase and a decrease of said position in a predetermined direction, additionally comprising:

negative accumulation means for providing a signal representation of a negative base number which is decreased and increased, respectively, in response to said tracking pulses; and means for causing said second modulation counter to store a signal representation of said negative base number.

5. A position measurement system according to claim 1 wherein said output circuit additionally provides a cosine output pulse having a pulse-width complementary to said sine output pulse.

6. A position measurement system according to claim 2 for providing an indication in metric units of a displacement between relatively movable members of said transducer, wherein said tracking pulse is generated in response to a least change in Imperial units, said modulator including similar first and second modulation counters which respectively provide first and second modulator pulses in response to clock pulses provided at a known frequency, each modulation counter providing a modulator pulse in response to a known number of clock pulses, a time displacement between corresponding portions of said modulator pulses being proportional to said displacement, said modulator additionally comprising a reference counter which provides a reference pulse train in response to said clock pulses and a reference pulse in response to said known number of clock pulses, comprising:

circuit means for modifying said first and second modulation counters to cause the provision of said modulator pulses in response to 2.54 times said known number of clock pulses, said circuit means further comprising:

means for providing to said modulation counters clock pulses at a clock pulse frequency which is 2.5 times said known frequency; and means for providing to said reference counter clock pulses at a clock pulse frequency which is 125/127 times said known frequency.

* * * * *